Figure 1:
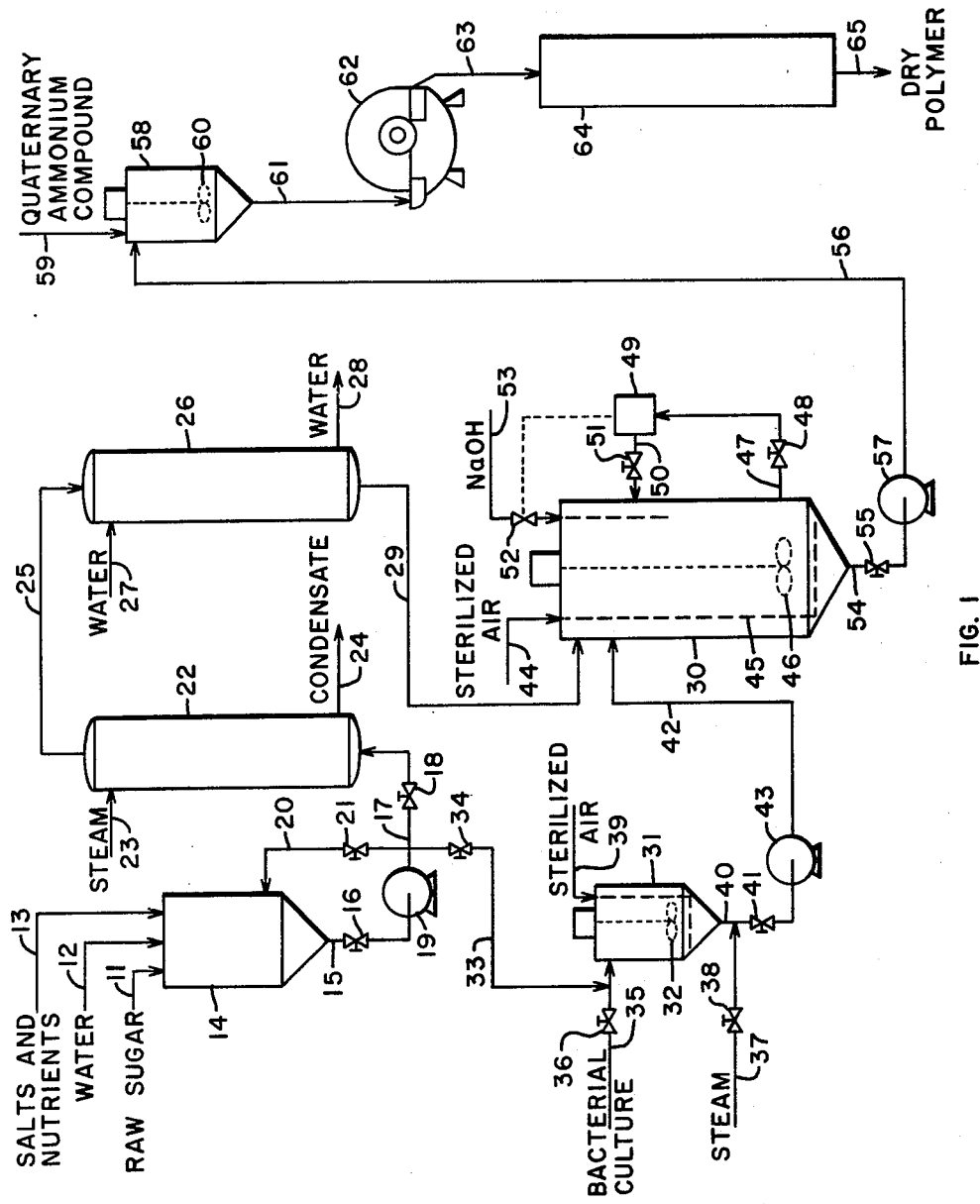

Dec. 29, 1964  G. P. LINDBLOM ETAL  3,163,602
SUBSTITUTED HETEROPOLYSACCHARIDE
Filed Dec. 30, 1960  2 Sheets-Sheet 1

Gordon P. Lindblom
John T. Patton  INVENTORS

BY James E. Reel
ATTORNEY

United States Patent Office 3,163,602
Patented Dec. 29, 1964

3,163,602
SUBSTITUTED HETEROPOLYSACCHARIDE
Gordon P. Lindblom and John T. Patton, Tulsa, Okla., assignors to Jersey Production Research Company, a corporation of Delaware
Filed Dec. 30, 1960, Ser. No. 79,695
16 Claims. (Cl. 252—8.55)

The present invention relates to polymers useful for altering the flow properties of aqueous media and more particularly relates to a new class of substituted heteropolysaccharides which are particularly effective for increasing the viscosities of brines and similar solutions. In still greater particularity, the invention realtes to substituted heteropolysaccharides produced by reacting quaternary ammonium compounds with polymers derived by the action of bacteria of the genus Xanthomonas on carbohydrates.

Interest in the development of more effective materials for thickening aqueous media has been spurred in recent years by indications that the use of such materials may permit significant improvements in secondary recovery operations carried out in the petroleum industry. Laboratory work and field tests have shown that the injection of a viscous solution in place of the water or brine normally employed in oil field waterflooding projects results in a substantial increase in the amount of crude oil which can be displaced from a subsurface reservoir during the course of such a project. The principal reason for this is that water, because its viscosity is lower than that of the oil in place, tends to flow selectively through the more permeable sections of the reservoir during waterflooding. Much of the oil contained in the less permeable zones is bypassed by the water and is never recovered. The use of water or brine containing a thickening agent in concentrations sufficient to give viscosities more nearly equivalent to that of the oil reduces this tendency toward selective flow and thus promotes more uniform piston-like displacement of the oil. The use of thickened water or brine in this manner promises to reduce significantly the amount of oil which must be left behind in the exploitation of petroleum reservoirs.

The chief obstacle to the widespread use of viscous solutions during waterflooding operations carried out to date has been the lack of a satisfactory thickening agent. A number of polymers, gums and resins have been proposed as thickeners in the past. None of these has been found suitable. Most synthetic polymers, natural gums and resins such as gum tragacanth, gum arabic, agar, alginic acid, gum ghatti and the like have only limited thickening powers and would have to be employed in concentrations that would make the cost of using them prohibitive. Even if their use were economically feasible, however, tests have shown that such materials are unsatisfactory. Solutions of many of them tend to lose their viscosity after exposure to elevated temperatures for only a short time. Others are rapidly degraded by brines and similar solutions. Still others are adsorbed upon oil sands or tend to plug porous subsurface formations. These and other considerations almost completely rule out such materials for use in waterflooding operations and other processes where an inexpensive, highly stable thickener is required.

The present invention provides a new and improved composition for thickening brines and similar solutions which is relatively free of the disadvantages characteristic of thickening agents suggested for use in the past. In accordance with the invention, it has now been found that substituted heteropolysaccharides prepared by the fermentation of carbohydrates with bacteria of the genus Xanthomonas and subsequent reaction of the fermentation product with a quaternary ammonium compound produce marked increases in the viscosities of brines and similar solutions to which they are added in low concentrations. Such heteropolysaccharides are stable for long periods at elevated temperatures and are not substantially degraded by salts normally found in oil field brines. They are not adsorbed to a significant extent upon subsurface formations. These and other properties of the substituted heteropolysaccharides of the invention render them eminently suitable for thickening brines to be used in oil field secondary recovery processes and in a variety of other applications that require a highly stable thickener which is effective at low concentrations.

The heteropolysaccharides which are modified in accordance with the invention by reacting them with quaternary ammonium compounds are heteroglycans produced by the action of bacteria of the genus Xanthomonas upon carbohydrates. Representative species of these bacteria include *Xanthomonas begoniae*, *Xanthomonas campestris*, *Xanthomonas carotae*, *Xanthomonas hederae*, *Xanthomonas incanae*, *Xanthomonas malvacearum*, *Xanthomonas papavericola*, *Xanthomonas phaseoli*, *Xanthomonas pisi*, and *Xanthomonas translucens*. Laboratory work has indicated that production of the heteropolysaccharides is a characteristic trait of all members of the genus Xanthomonas. Experiments have shown, however, that certain species of these bacteria produce the polymers with particular efficiency and are therefore more attractive for purposes of the invention than are others. *Xanthomonas begoniae*, *Xanthomonas campestris*, *Xanthomonas incanae* and *Xanthomonas pisi* are particularly outstanding in this respect and are therefore preferred for purposes of the invention.

Organisms of the Xanthomonas genus act upon a wide variety of carbohydrates to produce the heteropolysaccharides utilized for purposes of the invention. Suitable carbohydrates include glucose, sucrose, fructose, maltose, lactose, galactose, soluble starch, corn starch and the like. Fermentation studies have shown that the carbohydrates employed need not be in a refined state and may instead be utilized in the form of crude materials derived from natural sources. Specific examples of such crude materials include raw sugar, crude molasses, sugar beet juice, raw potato starch and the like. Since the crude materials are generally much less expensive than the corresponding refined carbohydrates, they are in most cases preferred for use as substrates in preparing the heteropolysaccharides.

The heteropolysaccharides are normally produced from carbohydrates such as those described above by employing an aqueous fermentation medium containing from about 1 to about 5 weight percent of the carbohydrate. From about 0.1 to about 0.5 weight percent of dipotassium acid phosphate and from about 0.1 to about 10 weight percent of a nutrient containing suitable trace elements and organic nitrogen sources is usually added to the carbohydrate solution to complete the fermentation medium. The nutrient employed will normally be a byproduct material such as distillers' solubles or the like. "Stimuflav" marketed by Hiram Walker & Sons is such a commercial nutrient. A mixture containing 2 weight percent raw sugar, 0.1 weight percent dipotassium acid phosphate and 0.5 weight percent "Stimuflav" has been found to yield excellent results. The use of such a mixture is not necessary in all instances, however. The trace elements and organic nitrogen sources contained in the nutrient are apparently also present in certain of the crude carbohydrate source materials, raw sugar beet juice for example, and hence it has been found that the addition of a nutrient to such materials may not be necessary.

Fermentation of the medium thus prepared to produce the heteropolysaccharide is carried out by first sterilizing the medium and then inoculating it with bacteria of the genus Xanthomonas. The fermentation reaction is conducted under aerobic conditions and hence sterilized air is bubbled through the medium as it ferments. The medium is maintained at a temperature between about 70° F. and about 100° F., preferably between about 75° F. and about 85° F., for a period of from about 1 to about 3 days. As the fermentation reaction progresses, the viscosity of the medium increases rapidly due to formation of the heteropolysaccharide. The rate of fermentation is controlled to some extent by the pH of the fermenting medium. In general, fermentation takes place most rapidly at pH values between about 6.0 and about 7.5. Control of the pH at a level between about 6.5 and about 7.2 is preferred. Sodium hydroxide or a similar alkaline material may be added to the medium continuously or at intervals in amounts sufficient to maintain the pH levels within the desired range. After the viscosity of the medium has reached a value of about 70 centipoises or higher, as determined by testing the fermentate in 1:6 dilution with distilled water with a Brookfield Viscometer at 80° F., the reaction may be halted. In a well-controlled fermentation process, this point is normally reached after about 48 hours. The crude heteropolysaccharide produced by fermentation can then be separated from the bacterial cells by centrifugation or filtration if desired. Precipitation with methanol, ethanol, acetone or a similar reagent permits isolation of the relatively pure heteropolysaccharide. Separation of the heteropolysaccharide from the bacterial cells is not essential in the preparation of the improved thickening agent of the invention, however, and thus this step may be omitted in order to reduce the cost of preparing the thickening agent.

The heteropolysaccharide prepared by the action of bacteria of the genus Xanthomonas on carbohydrates is normally obtained as a thick viscous solution having a dull yellow color. Analytical work has shown that the heteropolysaccharide itself is a heteroglycan containing mannose, glucose, glucuronic acid salts and acetyl groups in a molar ratio of about 2:1:1:1 respectively. Also present may be about 5.5 weight percent of inorganic materials plus about 0.15 weight percent each of phosphorus and nitrogen. The above ratios and percentages may vary slightly in some cases, depending upon the particular Xanthomonas specie and the carbohydrate employed in the fermentation reaction. Studies have shown, however, that the materials produced by the various organisms from a wide variety of substrates are identical for all practical purposes. When dried, the relatively pure heteropolysaccharides are soft bulky powders slightly tinted by colored materials from the culture medium. They swell rapidly in the presence of small amounts of water and are readily soluble in larger quantities of water.

The heteropolysaccharides produced in the manner described in the preceding paragraphs are converted into the improved thickening agents of the invention by reacting them with quaternary ammonium compounds to form quaternary ammonium salts. Suitable quaternary ammonium compounds are those having alkyl, alkenyl or aryl substituents containing from about 1 to about 24 carbon atoms each. These are preferably employed in the form of quaternary ammonium halides but in some cases other derivatives, the hydroxides for example, may also be used. Representative quaternary ammonium compounds which may be reacted with the heteropolysaccharides include tetramethyl ammonium hydroxide, tetraethyl ammonium chloride, tetrapropyl ammonium chloride, tetrabutyl ammonium bromide, tripropyl methyl ammonium chloride, dimethyl dihexyl ammonium chloride, diethyl dibutenyl ammonium chloride, dibutyl dioctadecyl ammonium chloride, trimethyl benzyl ammonium hydroxide, hexyl trioleyl ammonium hydroxide, dibenzyl dihexadecyl ammonium chloride, trimethyl cyclohexyl ammonium chloride, didodecyl dicyclopentyl ammonium chloride, trimethyl eicosyl ammonium chloride and the like. The quaternary ammonium compounds containing from about 16 to about 48 carbon atoms per molecule are preferred.

Also useful for purposes of the invention are quaternary ammonium compounds containing substituent groups derived from naturally-occurring materials such as tallow fat, coconut oil, soy bean oil and the like. Such compounds normally contain from 1 to 3 methyl groups and one or more long chain aliphatic substituent groups. One example of such a substituent group is the coco group derived from coconut oil. This group consists of long chain aliphatic radicals containing from about 10 to about 18 carbon atoms. A typical analysis shows about 4.0 percent $C_{10}$ radicals, about 55.5 percent $C_{12}$ radicals, about 22.5 percent $C_{14}$ radicals, about 14.0 percent $C_{16}$ radicals and about 4.0 percent $C_{18}$ radicals. The tallow group contains primarily saturated and unsaturated $C_{16}$ and $C_{18}$ radicals; while the soya group is generally made up of saturated and unsaturated $C_{16}$ to $C_{18}$ radicals in somewhat different proportions. Representative of the quaternary ammonium compounds containing mixed substituent groups are trimethyl tallow ammonium hydroxide, dimethyl dicoco ammonium chloride, dimethyl soya benzyl ammonium chloride, diethyl tallow hexyl ammonium chloride, methyl trisoya ammonium hydroxide and the like.

In some cases quaternary ammonium compounds containing substituted substituent groups, those containing halogenated or hydroxylated alkyl or aryl radicals for example, may also be used. A variety of suitable quaternary ammonium compounds are available from commercial sources and will be readily familiar to those skilled in the art.

The reaction of the quaternary ammonium compounds with the heteropolysaccharides to produce the substituted polymers of the invention is carried out by adding the quaternary ammonium compound to an aqueous solution of the heteropolysaccharide. It is generally preferred to employ the crude heteropolysaccharide solution recovered from the fermentation step of the process for this purpose but an aqueous solution containing purified heteropolysaccharide in a concentration between about 0.01 percent and about 3 percent by weight may be prepared and used if desired. The quaternary ammonium compound may be added to the polymer solution in a concentration ranging from a few parts per million to about 0.02 pound moles of quaternary per pound of polymer. It is generally preferred to utilize the quaternary ammonium compound in quantities in excess of the theoretical amount determined by titrating the heteropolysaccharide solution. Upon mixing, reaction of the quaternary ammonium compound with the heteropolysaccharide takes place readily at room temperature. The reaction product is obtained as a soft precipitate. This precipitate may be removed from the solution by decanting, filtration or centrifugation. The product may then be dried to produce a soft fluffy powder. It is obvious that the precipitate thus obtained is not soluble in distilled water. The new polymers of the invention are soluble, however, in brines. Solubility has been obtained in some instances in 2 percent solutions of NaCl. Other polymers may require 5 percent to 10 percent salt to induce solubility.

Figure 2:
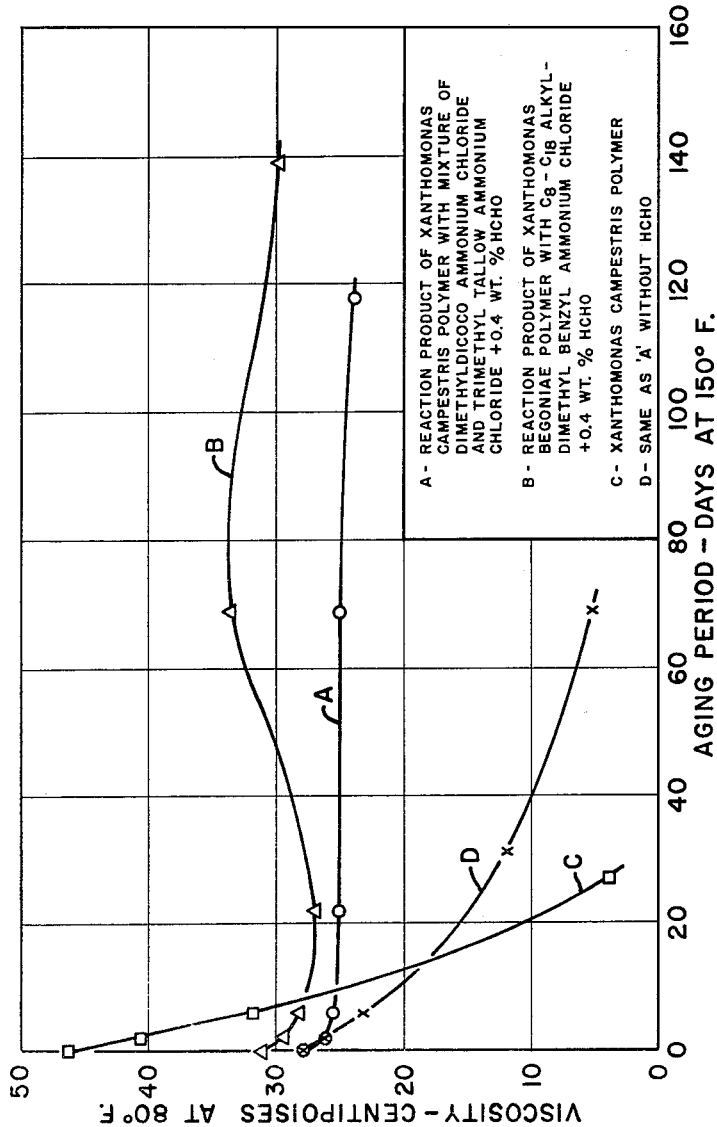

The exact nature and objects of the invention can be more fully understood by referring to the following detailed description of a specific process for manufacturing the substituted heteropolysaccharides of the invention and to the accompanying drawing, in which:

FIGURE 1 is a schematic diagram of the process utilized for production of the substituted heteropolysaccharides; and, FIGURE 2 is a graph showing the results obtained in stability tests of the substituted heteropolysaccharides.

Turning now to FIGURE 1 of the drawing, raw cane sugar is introduced from a suitable source through line 11 into the system depicted. Water is admitted through line 12. Dipotassium acid phosphate and a bacterial nutrient, distillers' solubles for example, are added to the system through line 13. The constituents are combined in mixing tank 14 in proportions to produce a fermentation medium containing about 2 weight percent of raw sugar, about 0.1 weight percent of dipotassium acid phosphate and about 0.5 weight percent of distillers' solubles. The solution thus prepared is withdrawn from the mixing tank through line 15 containing valve 16 and is then pumped through line 17 and valve 18 into the sterilization stage of the process by means of pump 19. A recycle line 20 containing valve 21 is provided in order to permit the recirculation of liquid discharged by the pump into the feed tank if desired.

The sterilization unit employed in the process comprises a heat exchanger, a jacketed vessel, a vat provided with an electrical heater or similar apparatus 22 within which the fermentation medium can be heated to a temperature of from about 200° F. to about 275° F. and held at that temperature for a period of from about 2 to about 5 minutes or longer. Higher temperatures and longer residence times may be employed if desired but in general the temperatures and times indicated will be sufficient to kill any bacteria present in the fermentation medium and render it sterile. As shown in the drawing, the sterilization unit consists of a heat exchanger into which steam is introduced through line 23 and condensate is withdrawn through line 24.

Sterile fermentation medium is withdrawn from the sterilization unit at a temperature between about 200° F. and about 275° F. through line 25 and is passed into cooling unit 26. The cooling unit shown schematically in the drawing is a heat exchanger into which water or a similar cooling fluid is introduced through line 27 and is subsequently withdrawn therefrom through line 28. A jacketed vessel, a vat containing cooling coils or other conventional cooling apparatus may be utilized in place of such a heat exchanger. The temperature of the fermentation medium is dropped in the cooling unit to a point between about 75° F. and about 100° F., preferably to a temperature between about 75° F. and about 85° F. The cool, sterile medium is then discharged through line 29 into fermentation vessel 30.

An inoculum containing Xanthomonas campestris organisms or similar bacteria is introduced into the fermentation vessel to effect the fermentation reaction. The inoculum is prepared and stored in preparation tank 31 provided with an agitator 32. In the system shown in the drawing, the preparation tank is connected to mixing tank 14 by line 33 containing valve 34 in order to permit the transfer of fermentation medium from the mixing tank to the inoculum preparation tank. The bacterial culture may be added to the preparation tank through line 35 containing valve 36. The inoculum is prepared by permitting the bacteria to grow upon a small amount of fermentation medium previously sterilized within the preparation tank by bubbling steam into it through line 37 containing valve 38. Sterilized air necessary for growth of the bacteria is introduced into the preparation tank through line 39. The fermenting solution is provided with gentle agitation during the incubation period. The rate at which the inoculum is produced is controlled in order to maintain a steady supply for use in the main fermentation process. The inoculum thus prepared is withdrawn from the preparation tank through line 40 containing valve 41 and is passed through line 42 into the fermentation vessel 30 by means of pump 43.

Sterilized air is injected into the fermentation vessel 30 through line 44 in order to provide the aerobic conditions necessary for growth of the bacteria in the sterile medium. A sparger, distribution plate or similar device 45 is located in the fermentation vessel in order to assure effective contact between the air and the fermentation medium. Gentle agitation is provided by propeller agitator 46. During the course of the fermentation reaction, the pH of the medium will normally decrease due to the production of an acid product by the bacteria. To control the pH, a portion of the medium is circulated through lines 47 containing valve 48 into a conventional pH meter 49 and is thereafter returned to vessel 30 through line 50 containing valve 51. The pH meter is electrically connected to an automatic valve 52 which serves to control the addition of sodium hydroxide or a similar base to the fermentation vessel through line 53. The pH of the fermenting medium is thus continuously adjusted to maintain a valve between about 6 and about 7.5. Maintenance of the pH values between about 6.5 and about 7.2 is preferred. The amount of sodium hydroxide or other base added through line 53 to hold the pH at the desired level will depend upon the concentration of the base, the volume of fermentate and the stage of the fermentation reaction. In lieu of an external pH meter as shown in the drawing, an electrode assembly suitable for direct emersion in the fermentation vessel may be utilized. Commercial pH recording and controlling equipment for use in the process of the invention is available from a number of sources and will be familiar to those skilled in the art. In some cases the pH of the fermentation medium may also be controlled by means of a buffer solution incorporated into the medium. A solution of $K_2HPO_4$, for example, may be employed for this purpose.

Fermentation in vessel 30 is normally carried out for a period of from 2 to 3 days or longer. At the end of this period, an aqueous solution of heteropolysaccharide formed by the action of the bacteria on the sugar is withdrawn from vessel 30 through line 54 containing valve 55. The solution thus withdrawn generally contains from about 0.5 to about 4 weight percent of the heteropolysaccharide and normally has a viscosity of between about 500 and about 50,000 centipoises. The viscous solution is passed through line 56 by means of pump 57 into reaction vessel 58. A solution of dimethyl soya benzyl ammonium chloride or a similar quaternary ammonium compound containing substituent groups having from 1 to about 24 carbon atoms each is added to reaction vessel 58 through line 59 in an amount sufficient to give an excess of the quaternary ammonium compound. The quantity of the quaternary ammonium compound to be utilized can readily be determined by titrating the fermentation product in a conventional manner. Agitation is provided by propeller type mixer 60 or a similar agitating device. The heteropolysaccharide and the quaternary ammonium compound rapidly react with one another to form the substituted heteropolysaccharide. The substituted material is insoluble in the aqueous reaction mixture and is withdrawn from reaction vessel 58 as an aqueous slurry through line 61. The slurry is filtered in continuous vacuum filter 62. The solid substituted heteropolysaccharide is discharged from vacuum filter 62 and transferred by means of conveyer or similar solids handling device 63 to dryer 64. The dryer utilized may be of the tray type or of the tunnel type. The heteropolysaccharide is dried at a temperature in the range of from about 150° F. to about 250° F. and is discharged as a dry finely divided powder by conveyer or other means 65. The powder may be bagged for future use or may be further processed for the preparation of other products.

It will be understood that the foregoing description and FIGURE 1 of the drawing are directed to a specific process for preparing the improved thickening agent of the invention and that the invention itself is not limited to the precise reactants and apparatus described. The process depicted in the drawing is essentially a batch type operation. Such a process can obviously be converted into a continuous operation by continuously introducing sterile medium and withdrawing fermentate from the fermentation vessel and by making other minor modifications. It will be recognized that instrumentation, steam lines and other features conventional in processes such as that described above have not been set forth in full detail. These and similar features will be familiar to those skilled in the art and need not be specifically set forth in order to permit a full understanding of the invention.

The process of the invention can be further illustrated by referring to the results obtained in a series of experiments wherein substituted heteropolysaccharides were prepared in accordance with the invention and were tested to determine their effectiveness for thickening brines.

In the first of these experiments, an aqueous fermentation medium containing 2.0 weight percent of raw sugar, 0.1 weight percent of dipotassium acid phosphate and 0.05 weight percent of "Stimuflav," a commercial bacterial nutrient prepared from distillers' solubles, was prepared. After it had been sterilized and cooled to a temperature of about 75° F., this medium was inoculated with *Xanthomonas campestris* organisms and was fermented under aerobic conditions at a temperature of about 75° F. The pH of the fermenting medium was adjusted at intervals in order to maintain it at a level between about 6.5 and about 7.2. Upon completion of the fermentation reaction after about 72 hours, a viscous heteropolysaccharide solution having a viscosity of about 70 centipoises when tested in 1:6 dilution in distilled water, with a Brookfield viscometer, was obtained. The polymer thus produced was then reacted with dimethyl $C_8$–$C_{18}$ alkyl benzyl ammonium chloride to produce a substituted heteropolysaccharide. The substitution reaction was carried out by adding 0.1 percent solution of the quaternary to the fermentate until precipitation was complete. A slight excess was added to assure complete precipitation. The reaction took place readily upon mixing of the reactants at room temperature. The precipitate recovered by decanting off the liquid was a faint yellow color.

A second substituted heteropolysaccharide was produced by fermenting a medium containing about 2 weight percent raw sugar, about 0.1 weight percent dipotassium acid phosphate and about 0.05 weight precent of "Stimuflav" with bacteria from a culture of *Xanthomonas begoniae*. The fermentation was again carried out under aerobic conditions and with the addition of sodium hydroxide to control the pH. The heteropolysaccharide produced was then reacted with an excess of an aqueous solution containing 50 percent dimethyl dicoco ammonium chloride and 50 percent trimethyl tallow ammonium chloride. An insoluble precipitate similar in appearance to that obtained in the earlier reaction was recovered.

Following preparation of the substituted heteropolysaccharides as described in the preceding paragraphs, four test solutions were made up as follows:

*Solution A.*—A 28 centipoise solution of the reaction product of the *Xanthomonas campestris* polymer with mixed dimethyldicoco ammonium chloride-tallow trimethyl ammonium chloride in brine containing 3.68 weight percent sodium chloride and 0.4 weight percent formaldehyde as a preservative.

*Solution B.*—A 31 centipoise solution of the reaction product of the *Xanthomonas begoniae* polymer with $C_8$–$C_{18}$ alkyl dimethyl benzyl ammonium chloride in brine containing 10 percent sodium chloride and 0.4 weight percent of formaldehyde as a preservative.

*Solution C.*—A 46.4 centipoise solution of an unsubstituted *Xanthomonas campestris* polymer in brine containing 5.0 weight percent sodium chloride.

*Solution D.*—Same as solution A without formaldehyde.

Each of the test solutions thus prepared was poured into a sealed vessel and placed in a thermostatically controlled electric oven. The solutions were aged at a temperature of 150° F. Samples of each solution were withdrawn at intervals during the aging period. The viscosities of the aged samples were determined by utilizing a Brookfield viscometer to make the viscosity measurements. The results obtained are shown in the table below:

*Effect of Aging at Elevated Temperatures Upon Viscosities of Heteropolysaccharide Solutions*

| Aging Period, Days | Viscosity, Centipoises @ 80° F. | | | |
|---|---|---|---|---|
| | Solution A | Solution B | Solution C | Solution D |
| 0 | 28 | 31.0 | 46.4 | 28.0 |
| 2 | 26 | 29.4 | 40.6 | 26.2 |
| 6 | 25.6 | 28.6 | 31.8 | 23.2 |
| 22 | 25.0 | 27.0 | | |
| 27 | | | 3.8 | |
| 31 | | | | 12.0 |
| 69 | 25.0 | 33.6 | | 5.0 |
| 118 | 23.8 | | | |
| 139 | | 30.0 | | |

A comparison of the viscosities of solutions C and D in the table shows that the substituted heteropolysaccharides of the invention are significantly more stable during storage at 150° F. than are the corresponding unsubstituted heteropolysaccharides. The viscosity of solution C containing the unsubstituted polymer had decreased to only 3.8 centipoises after 27 days. That of solution D containing the substituted material was still 5 centipoises after 69 days, despite the fact that the initial viscosity of solution D was only slightly more than half that of solution C. This difference in viscosity losses clearly demonstrates the superior stability of the substituted heteropolysaccharides.

The above data also show that the substituted heteropolysaccharides are particularly effective in the presence of a small amount of formaldehyde. Solutions A and B containing about 0.4 weight percent formaldehyde showed only small losses in viscosity after 119 and 139 days respectively. These results are markedly superior to those obtained with the unsubstituted material and the substituted heteropolysaccharide containing no formaldehyde. The use of the heteropolysaccharides with from about 0.05 to about 5 percent by weight of formaldehyde is preferred.

What is claimed is:

1. A process for preparing an improved thickening agent which comprises preparing an aqueous solution of a heteropolysaccharide produced by the action of bacteria of of genus Xanthomonas on a carbohydrate, reacting said heteropolysaccharide in solution with a quaternary ammonium compound capable of forming a heteropolysaccharide-quaternary ammonium compound reaction product substantially insoluble in said solution, said quaternary ammonium compound having substituent groups in the $C_1$ to $C_{24}$ range, and recovering said reaction product from solution.

2. A process as defined by claim 1 wherein said quaternary ammonium compound is a quaternary ammonium halide.

3. A process as defined by claim 1 wherein said quaternary ammonium compound contains from 1 to 3 methyl groups and at least 1 long chain aliphatic group.

4. A process for preparing an improved thickening agent which comprises fermenting an aqueous carbohydrate solution with bacteria of the genus Xanthomonas to produce a heteropolysaccharide solution, adding a quaternary ammonium chloride containing from 1 to 3 methyl groups and at least 1 long chain aliphatic group to said heteropolysaccharide solution in a concentration sufficient to form a precipitate, and recovering the resulting precipitate from said solution.

5. A process as defined by claim 4 wherein said bacteria are of the species *Xanthomonas campestris*.

6. A process for preparing a viscous brine of improved stability which comprises reacting a heteropolysaccharide derived by the action of bacteria of the genus Xanthomonas on a carbohydrate in aqueous solution with a quaternary ammonium compound capable of forming a quaternary ammonium compound-heteropolysaccharide reaction product substantially insoluble in said solution, said quaternary ammonium compound having substituent groups containing from 1 to 24 carbon atoms per group, dissolving said reaction product in brine, and thereafter stabilizing said brine by the addition of formaldehyde.

7. A process as defined by claim 6 wherein said quaternary ammonium compound contains from 1 to 3 methyl groups and at least one long chain aliphatic group.

8. A process as defined by claim 6 wherein said heteropolysaccharide is one produced by *Xanthomonas begoniae*.

9. A process as defined by claim 6 wherein said quaternary ammonium compound is a dimethyl long chain alkyl benzyl ammonium chloride.

10. In a process wherein a brine is injected into a subsurface oil-bearing formation to displace crude oil contained therein, the improvement which comprises thickening said brine with a brine-soluble heteropolysaccharide quaternary ammonium compound reaction product produced by reacting a heteropolysaccharide derived by the action of bacteria of the genus Xanthomonas on a carbohydrate with a quaternary ammonium compound containing from 1 to 3 methyl groups and at least 1 long chain aliphatic group.

11. A process as defined by claim 10 wherein said brine is stabilized by the addition of formaldehyde.

12. A thickening agent produced by the fermentation of a carbohydrate with bacteria of the genus Xanthomonas and reaction of the resulting heteropolysaccharide with a quaternary ammonium compound having substituent groups containing from about 1 to about 24 carbon atoms each.

13. An aqueous solution containing sodium chloride in a concentration in excess of about 2 percent by weight and a brine-soluble heteropolysaccharide-quaternary ammonium compound reaction product in a concentration sufficient to increase the viscosity of said solution, said heteropolysaccharide being one derived by the action of bacteria of the genus Xanthomonas on a carbohydrate and said quaternary ammonium compound having substituent groups containing from 1 to about 24 carbon atoms each.

14. A stabilized viscous brine containing formaldehyde and a brine-soluble substituted heteropolysaccharide produced by the reaction of a quaternary ammonium compound containing from 1 to 3 methyl groups and at least 1 long chain aliphatic group with a heteropolysaccharide produced by the action of bacteria of the genus Xanthomonas on a carbohydrate.

15. A viscous brine thickened with a brine-soluble heteropolysaccharide-dimethyl long chain alkyl benzyl ammonium chloride reaction product, said heteropolysaccharide being a product derived by the action of Xanthomonas organisms on a sugar solution.

16. A brine to which has been added a thickening agent produced by the reaction of a heteropolysaccharide derived by the action of *Xanthomonas campestris* on a sugar solution with a mixed quaternary ammonium compound having long chain aliphatic substituent groups containing a total of from about 16 to about 48 carbon atoms per molecule.

References Cited in the file of this patent

UNITED STATES PATENTS

| | | |
|---|---|---|
| 2,360,327 | Bailey et al. | Oct. 17, 1944 |
| 2,563,526 | Gaver et al. | Aug. 7, 1951 |
| 2,731,414 | Binder et al. | Jan. 17, 1956 |
| 2,853,414 | Wimmer et al. | Sept. 23, 1958 |
| 2,879,268 | Jullander | Mar. 24, 1959 |
| 2,908,597 | Owen | Oct. 13, 1959 |
| 2,931,753 | Chesbro et al. | Apr. 5, 1960 |
| 3,020,207 | Patton | Feb. 6, 1962 |
| 3,053,765 | Sparks | Sept. 11, 1962 |
| 3,085,063 | Turbak | Apr. 9, 1963 |
| 3,119,812 | Rogovin et al. | Jan. 28, 1964 |

FOREIGN PATENTS

| | | |
|---|---|---|
| 876,603 | Great Britain | Sept. 6, 1961 |

OTHER REFERENCES

U.S. Dept. of Agriculture, Agricultural Research Service, Northern Utilization Research and Depelopment Division, Peoria, Illinois, Bulletin CA–N–9, September 1959 (3 pages).

Albrecht et al.: Recovery of Microbial Polysaccharide B–1459 With a Quaternary Ammonium Compound; article in Nature, vol. 194, No. 4835, June 30, 1962, page 1279.